United States Patent
Don et al.

(10) Patent No.: US 11,722,564 B1
(45) Date of Patent: Aug. 8, 2023

(54) DYNAMIC COMMAND FEEDBACK TO LIMIT IMPACT OF HOST-COPY MIGRATION BACKGROUND COPY LOAD

(71) Applicant: DELL PRODUCTS L.P., Hopkinton, MA (US)

(72) Inventors: Arieh Don, Newton, MA (US); Sanjib Mallick, Bangalore (IN); Vinay Rao, Bangalore (IN); Drew Tonnesen, Bedford, NH (US)

(73) Assignee: DELL PRODUCTS L.P., Hopkinton, MA (US)

( * ) Notice: Subject to any disclaimer, the term of this patent is extended or adjusted under 35 U.S.C. 154(b) by 0 days.

(21) Appl. No.: 17/965,886

(22) Filed: Oct. 14, 2022

(51) Int. Cl.
*H04L 67/1095* (2022.01)

(52) U.S. Cl.
CPC ............... *H04L 67/1095* (2013.01)

(58) Field of Classification Search
None
See application file for complete search history.

(56) References Cited

U.S. PATENT DOCUMENTS

| | | | | |
|---|---|---|---|---|
| 8,935,506 B1* | 1/2015 | Gopalan | ............ | G06F 12/1009 711/202 |
| 9,344,287 B2* | 5/2016 | Bestler | ............ | G06F 9/46 |
| 2020/0077892 A1* | 3/2020 | Tran | ............ | G08B 21/0492 |

OTHER PUBLICATIONS

Campbell et al., "Resource Management: Performance Assuredness in Distributed Cloud Computing via Online Reconfigurations", Jan. 1, 2018, IEEE, Wiley-IEEE Press 2018 (Edition: 1, pp. 368) (Year: 2018).*

* cited by examiner

*Primary Examiner* — Davoud A Zand
(74) *Attorney, Agent, or Firm* — Anderson Gorecki LLP

(57) ABSTRACT

A multi-path input-output (MPIO) driver in a host server reduces host-copy migration data transmission rate based on decrease in foreground IO response time. A baseline foreground IO response time measured before commencement of the host-copy migration is compared with a reference foreground IO response time measured after commencement of the host-copy migration. Increase in the foreground IO response time, expressed as a percentage or time value, that satisfies a predetermined limit will trigger reduction of the host-copy migration data transmission rate. The reference foreground IO response time is repeatedly measured and updated each time the host-copy migration data transmission rate is decreased.

20 Claims, 4 Drawing Sheets

US 11,722,564 B1

DYNAMIC COMMAND FEEDBACK TO LIMIT IMPACT OF HOST-COPY MIGRATION BACKGROUND COPY LOAD

TECHNICAL FIELD

The subject matter of this disclosure is generally related to data migration.

BACKGROUND

Network-attached storage (NAS), Storage Area Networks (SANs), and other types of storage systems can be configured to maintain host application data on logical storage objects for use by instances of host applications running on host servers. Examples of host applications may include, but are not limited to, multi-user software for email, accounting, inventory control, manufacturing, engineering, and a wide variety of other institutional functions. An individual storage array may simultaneously support multiple host applications and separate groups of storage objects may be created for each host application. Each host application-specific storage object may be accessed by multiple instances of the associated host application using foreground input-output commands (IOs). The storage objects, which are abstractions of space on physical storage drives, include contiguous ranges of logical block addresses (LBAs) at which blocks of host application data can be stored.

It is sometimes necessary or desirable to migrate storage objects between storage nodes such as geographically remote storage arrays. A common technique for performing storage object migration is known as a "host-copy migration." In a host copy migration, one of the host servers copies data from a source storage object on a first storage array and sends the storage object data to a target storage object on a second storage array. Access to storage object data during host-copy migration is sometimes characterized as being out-of-order because foreground IOs may be serviced by either copy of the storage object, depending on whether the data has been migrated to the target.

A drawback of host-copy migration is that unrestricted resource utilization associated with data migration can negatively affect servicing of foreground IOs. Differentiating resource allocation to foreground and background IOs can be difficult because the storage arrays, which are typically block-based, may not have the ability to distinguish between background IOs associated with the host-copy migration and foreground IOs from instances of host applications. It is known to place static limits on host-copy IO rate, such as by throttling traffic at a network switch, but it can be difficult or impossible to select a configuration that will efficiently complete the host-copy migration without degrading processing of foreground IOs to an unacceptable level.

SUMMARY

In accordance with some implementations, a method comprises: measuring a baseline response time of foreground data access between a host server and a first storage array; commencing host-copy migration of a storage object from the first storage array to a second storage array via the host server at a first data transmission rate; measuring a reference response time of foreground data access between the host server and the first storage array while the host-copy migration is being performed; and changing the first data transmission rate to a second data transmission rate based on the baseline response time and the reference response time.

In accordance with some implementations, an apparatus comprises: a host server comprising a processer, memory, and a multi-path input-output (MPIO) driver configured to: measure a baseline response time of foreground data access between the host server and a first storage array; commence host-copy migration of a storage object from the first storage array to a second storage array via the host server at a first data transmission rate; measure a reference response time of foreground data access between the host server and the first storage array while the host-copy migration is being performed; and change the first data transmission rate to a second data transmission rate based on the baseline response time and the reference response time.

In accordance with some implementations, a non-transitory computer-readable storage medium stores instructions that are executed by a storage array to perform a method comprising: measuring a baseline response time of foreground data access between a host server and a first storage array; commencing host-copy migration of a storage object from the first storage array to a second storage array via the host server at a first data transmission rate; measuring a reference response time of foreground data access between the host server and the first storage array while the host-copy migration is being performed; and changing the first data transmission rate to a second data transmission rate based on the baseline response time and the reference response time.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting.

Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
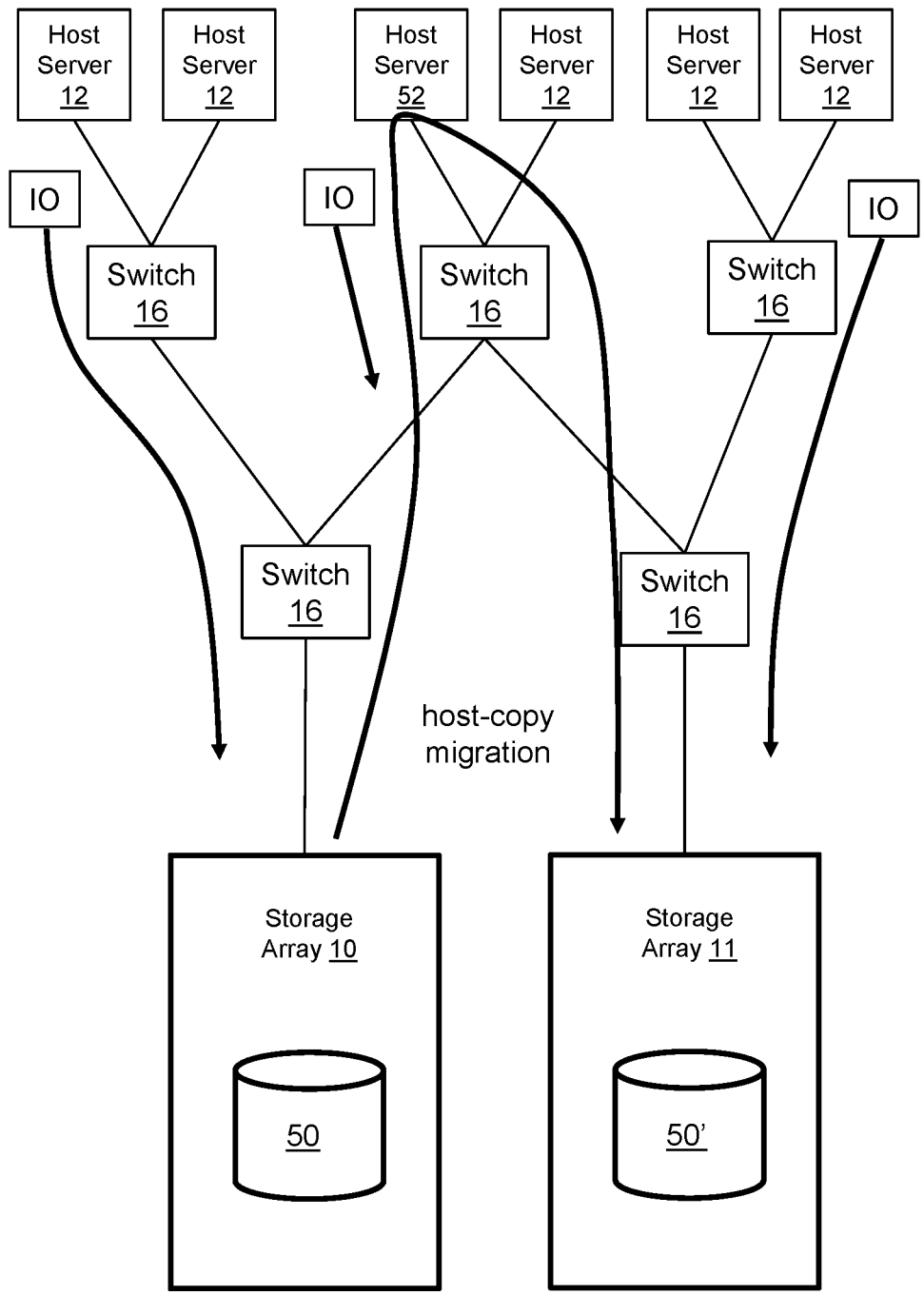
FIG. 1 illustrates a storage system in which an MPIO driver on a host server selects and adjusts a data transmission rate for host-copy migration based on the effect of background host-copy migration on foreground IOs.

FIG. 1 illustrates a storage system in which an MPIO driver on a host server 52 selects and adjusts the data transmission rate for host-copy migration based on the effect of background host-copy migration. A storage array 10 at a first site maintains a production storage object 50 that is accessed by instances of host applications running on host servers 12, 52 using foreground IOs. The host servers communicate with the first site storage array 10 and a storage array 11 at a second site via multiple layers of switches 16. The MPIO driver in host server 52 controls the transmission rate of background IOs associated with the host-copy migration between production storage 50, which is the source device, to production storage object 50', which is the target device, such that the response time of foreground IOs from instances of host applications is increased by no more than a predetermined limit.

Figure 2:
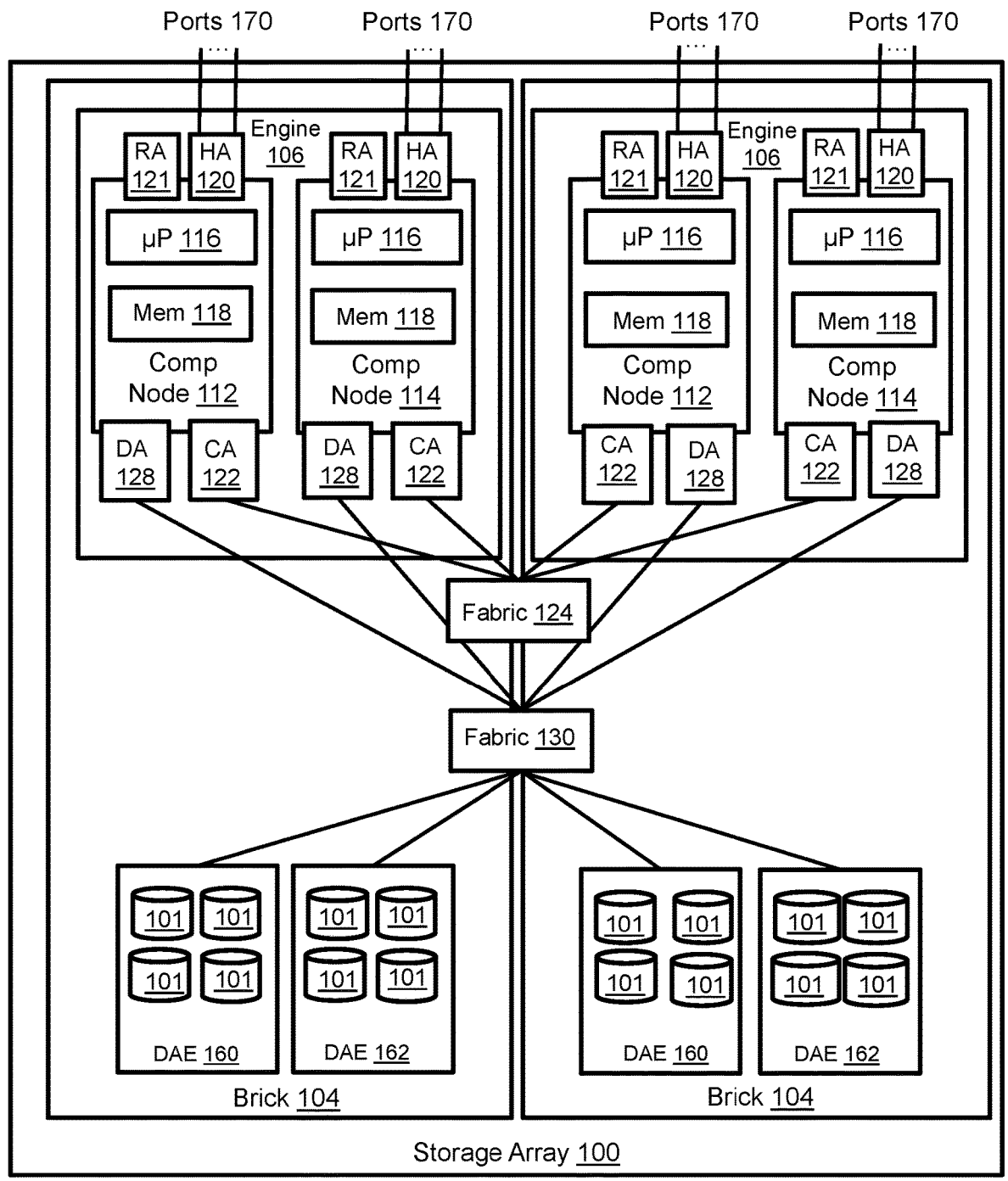
FIG. 2 illustrates a storage array in greater detail.

FIG. 2 illustrates an exemplary storage array 100 in greater detail. The storage array 100 includes one or more bricks 104. Each brick 104 includes an engine 106 and one or more disk array enclosures (DAEs) 160, 162. In the illustrated example there are only two engines, but the storage array could include a greater number of engines or a single engine. Each engine 106 includes two interconnected compute nodes 112, 114 that are arranged as a memory-mirrored pair for failover and may be referred to as "storage directors." Although it is known in the art to refer to the compute nodes of a SAN as "hosts," that naming convention is avoided in this disclosure to help distinguish the host servers from the compute nodes 112, 114. Each compute node may be implemented on a separate printed circuit board or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with the host servers. Each host adapter has multiple ports 170 for communicating with the host servers, which may be referred to as "initiators" that send IO commands to the storage array as a "target." Each initiator-target port pair defines a path. Each host server may be connected to the storage array via multiple ports corresponding to multiple paths that enable load balancing and failover. The host adapter resources include processors, volatile memory, and components such as IO chips that monitor link errors and IO failures such as missing frames, timeouts, and received aborts. Each compute node also includes a remote adapter (RA) 121 for communicating with other storage systems, e.g., the other storage arrays. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101.

Figure 3:
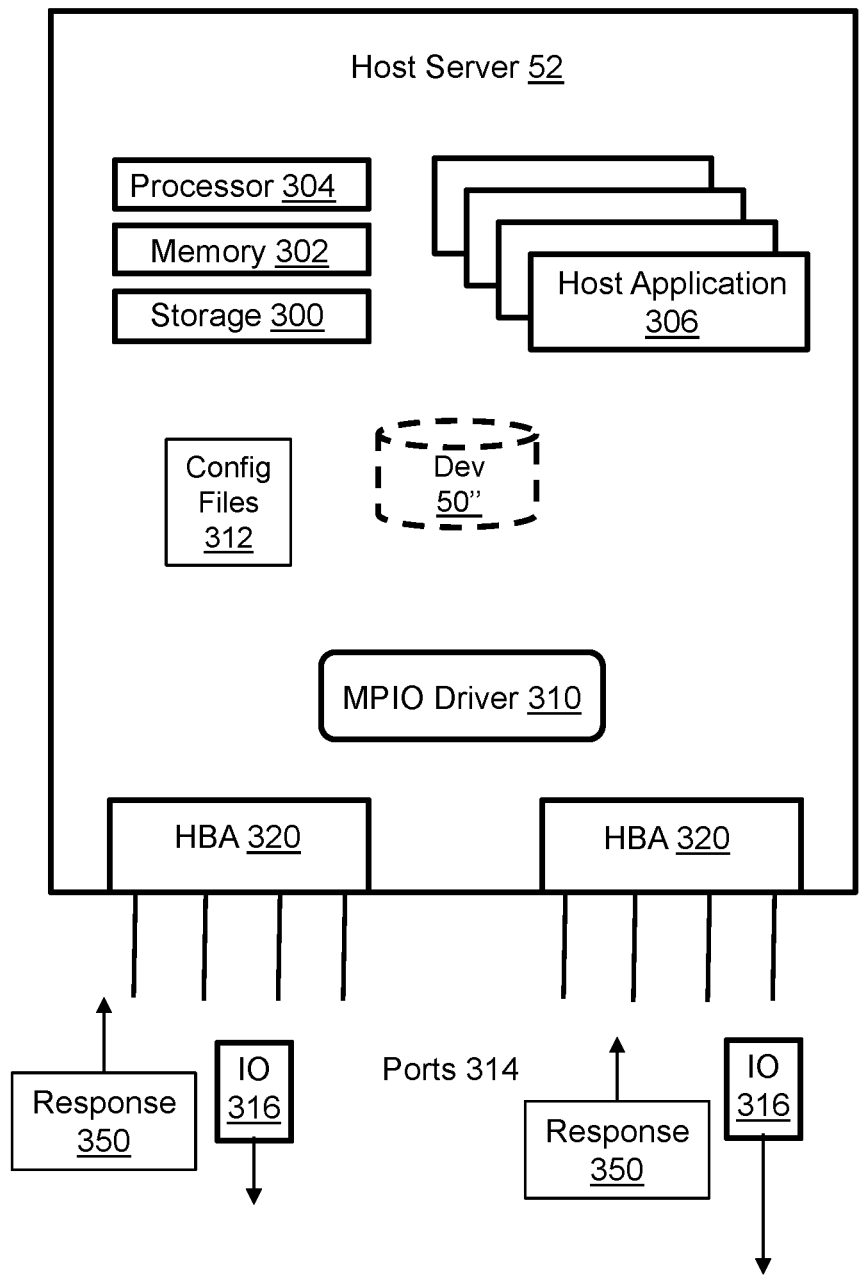
FIG. 3 illustrates one of the host servers in greater detail.

FIG. 3 illustrates host server 52 in greater detail. Each host server includes volatile memory 302, non-volatile storage 300, one or more tangible processors 304 that support instances 306 of a host application, ports 314, a Multi-Path Input-Output (MPIO) driver 310 running in the host kernel, and one or more host bus adapters (HBA) 320. Examples of host applications might include, but are not limited to, software for email, accounting, sales, inventory control, manufacturing, and a wide variety of other organizational functions. The MPIO driver 310 discovers storage objects 50, 50' (FIG. 1) maintained and presented by storage arrays and creates a corresponding logical host device 50", which is a representation of the storage objects. The instances of the host application use the logical host device 50" for data access, e.g., to read and write host application data to logical addresses. Corresponding foreground IOs 316 are generated and sent to the storage arrays via the MPIO driver and HBAs to access the storage object to read and write data. More specifically, the MPIO driver selects from among the multiple available paths between the host server and the storage arrays in order to balance IO loading. The IO is sent to the storage arrays via the host server and storage array ports corresponding to the selected path. Configuration files 312 maintained by the host server include metadata that describes the paths supported by the host server. For example, the port IDs and authentication credentials for each supported path are included in the configuration files, which may be persistently stored in storage and copied into memory for low latency access during operation. The HBAs includes components such as IO chips that monitor response time, link errors and IO failures such as missing frames, timeouts, and received aborts. Response time may be measured as elapsed time between the host server 52 sending a foreground IO 316 to a storage array and the host server receiving a response 350 from the storage array, where the response is the requested data (in the case of a RD) or an ack (in the case of a WR) from the storage array.

Figure 4:
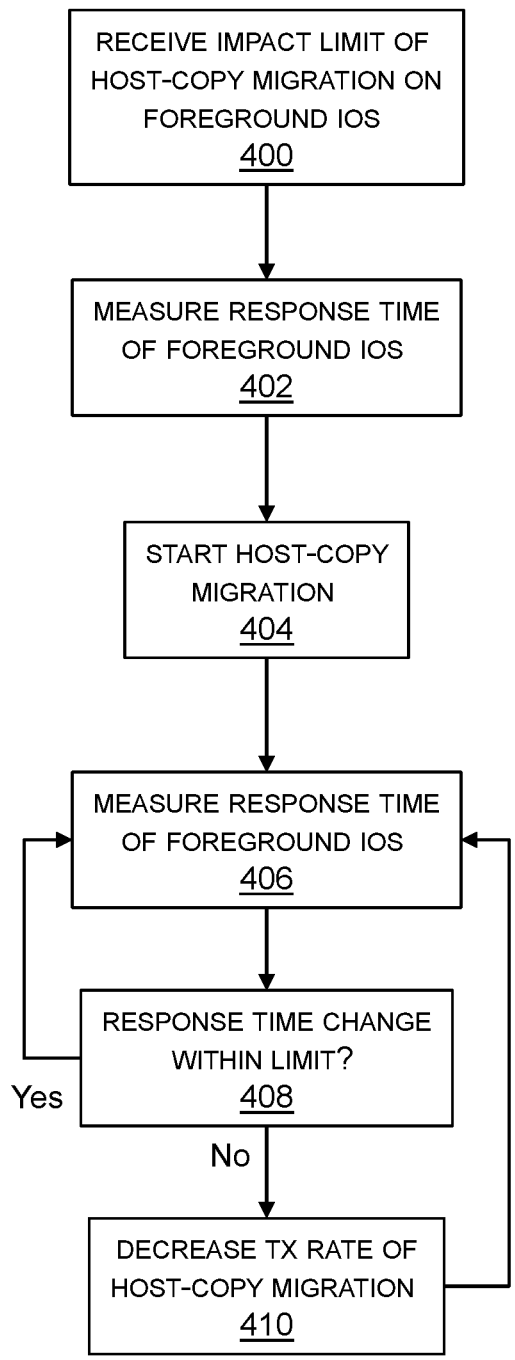
FIG. 4 illustrates a method for selecting a rate for host-copy migration based on the effect of background host-copy migration on foreground IOs.

FIG. 4 illustrates a method implemented by the MPIO driver 310 (FIG. 3) in the host server for selecting a background IO data transmission rate for host-copy migration based on the effect on foreground IOs. Step 400 is receiving an impact limit of background host-copy migration on foreground IOs. The impact limit may be defined and expressed in a wide variety of ways, but for context it may be the change (increase) in foreground IO response time measured as a time value, e.g., X msec, or a percentage increase relative to current response time, e.g., Y % of current response time in msec. Step 402 is measuring the current response time of foreground IOs. Foreground IOs are IOs initiated by instances of a host application that result in access to a production storage object on a storage array. The measurement may consider all IOs generated by instances of host applications running on the host server, only IOs to the migration source site storage array, or only IOs to the storage object being host-copy migrated. The measurement may be an average of response times of multiple foreground IOs over a predetermined time period. Step 404 is starting the host-copy migration. The host-copy migration may be started at a predetermined, limited data transmission rate or at an unlimited rate that may be the maximum possible rate with available resources or approximately the same rate as foreground IOs. Step 406 is measuring the response time of foreground IOs after commencement of the host-copy migration. The measurement may be an average of response times of foreground IOs over a predetermined time period. The measurement may consider all IOs generated by instances of host applications running on the host server, only IOs to the migration source site storage array, or only IOs to the storage object being host-copy migrated. Step 408 is calculating whether the response time change (before and after commencement of host-copy migration) is within the predetermined limit. For example, the calculation may determine whether the foreground 10 response time measured in step 406 is at least X msec greater than the foreground 10 response time measured in step 402, or whether the foreground 10 response time measured in step 406 is at least Y % greater than the foreground 10 response time measured in step 402. If the response time measured in step 406 is within the limit, then the foreground 10 response time continues to be measured by returning to step 406. If the response time measured in step 406 is outside the limit, then the transmission rate of the host-copy background migration is decreased in step 410. The decrease may be by a predetermined fixed amount, e.g., Z µSec, or an amount calculated as a function of the difference between the foreground 10 response time measured in step 406 and the foreground IO response time measured in step 402. For example, the amount of rate decrease required to bring the response time of foreground IOs within the limit may be calculated and applied. Flow then returns to step 406. The iterations continue until the host-copy migration is complete so the transmission rate host-copy migration may be decreased multiple times.

The MPIO driver is capable of implementing the processes described above because, among other things, the MPIO driver can distinguish between foreground IOs associated with operation of host application instances and background IOs associated with host-copy migration because those IOs originate from the host server. Furthermore, the MPIO driver is well-placed to measure foreground IO response time. Still further, the MPIO driver has control over queuing of IO transmission from the host server and can be configured to adjust the transmission rates of different types of IO traffic.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
measuring a baseline response time of foreground data access between a host server and a first storage array;
commencing host-copy migration of a storage object from the first storage array to a second storage array via the host server at a first data transmission rate;
measuring a reference response time of foreground data access between the host server and the first storage array while the host-copy migration is being performed; and
changing the first data transmission rate to a second data transmission rate based on the baseline response time and the reference response time.

2. The method of claim 1 further comprising calculating a percent increase between the reference response time and the baseline response time and changing the first data transmission rate to the second data transmission rate based on the percent increase between the baseline response time and the reference response time exceeding a percentage limit.

3. The method of claim 1 further comprising calculating a time increase between the reference response time and the baseline response time and changing the first data transmission rate to the second data transmission rate based on the time increase between the baseline response time and the reference response time exceeding a percentage limit.

4. The method of claim 1 further comprising measuring an updated reference response time after changing the first data transmission rate to a second data transmission rate based on the baseline response time and the reference response time.

5. The method of claim 4 further comprising changing the second data transmission rate to a third data transmission rate based on the time increase between the baseline response time and the updated reference response time exceeding a time limit.

6. The method of claim 4 further comprising changing the second data transmission rate to a third data transmission rate based on the time increase between the baseline response time and the updated reference response time exceeding a percentage limit.

7. The method of claim 1 further comprising selecting the second data transmission rate based on the baseline response time and the reference response time.

8. An apparatus comprising:
a host server comprising a processor, memory, and a multi-path input-output (MPIO) driver configured to:
measure a baseline response time of foreground data access between the host server and a first storage array;
commence host-copy migration of a storage object from the first storage array to a second storage array via the host server at a first data transmission rate;
measure a reference response time of foreground data access between the host server and the first storage array while the host-copy migration is being performed; and change the first data transmission rate to a second data transmission rate based on the baseline response time and the reference response time.

9. The apparatus of claim 8 further comprising the MPIO driver configured to calculate a percent increase between the reference response time and the baseline response time and change the first data transmission rate to the second data transmission rate based on the percent increase between the baseline response time and the reference response time exceeding a percentage limit.

10. The apparatus of claim 8 further comprising the MPIO driver configured to calculate a time increase between the reference response time and the baseline response time and changing the first data transmission rate to the second data transmission rate based on the time increase between the baseline response time and the reference response time exceeding a percentage limit.

11. The apparatus of claim 8 further comprising the MPIO driver configured to measure an updated reference response time after changing the first data transmission rate to a second data transmission rate based on the baseline response time and the reference response time.

12. The apparatus of claim 11 further comprising the MPIO driver configured to change the second data transmission rate to a third data transmission rate based on the time increase between the baseline response time and the updated reference response time exceeding a time limit.

13. The apparatus of claim 11 further comprising the MPIO driver configured to change the second data transmission rate to a third data transmission rate based on the time increase between the baseline response time and the updated reference response time exceeding a percentage limit.

14. The apparatus of claim 8 further comprising the MPIO driver configured to select the second data transmission rate based on the baseline response time and the reference response time.

15. A non-transitory computer-readable storage medium storing instructions that are executed by a storage array to perform a method comprising:
measuring a baseline response time of foreground data access between a host server and a first storage array;
commencing host-copy migration of a storage object from the first storage array to a second storage array via the host server at a first data transmission rate;
measuring a reference response time of foreground data access between the host server and the first storage array while the host-copy migration is being performed; and
changing the first data transmission rate to a second data transmission rate based on the baseline response time and the reference response time.

16. The non-transitory computer-readable storage medium of claim 15 in which the method further comprises calculating a percent increase between the reference response time and the baseline response time and changing the first data transmission rate to the second data transmission rate based on the percent increase between the baseline response time and the reference response time exceeding a percentage limit.

17. The non-transitory computer-readable storage medium of claim 15 in which the method further comprises calculating a time increase between the reference response time and the baseline response time and changing the first data transmission rate to the second data transmission rate based on the time increase between the baseline response time and the reference response time exceeding a percentage limit.

18. The non-transitory computer-readable storage medium of claim 15 in which the method further comprises measuring an updated reference response time after changing the first data transmission rate to a second data transmission rate based on the baseline response time and the reference response time.

19. The non-transitory computer-readable storage medium of claim 18 in which the method further comprises changing the second data transmission rate to a third data transmission rate based on the time increase between the baseline response time and the updated reference response time exceeding a time limit.

20. The non-transitory computer-readable storage medium of claim 18 in which the method further comprises changing the second data transmission rate to a third data transmission rate based on the time increase between the baseline response time and the updated reference response time exceeding a percentage limit.

* * * * *